(12) United States Patent
Wheatley et al.

(10) Patent No.: US 8,373,742 B2
(45) Date of Patent: Feb. 12, 2013

(54) METHOD AND APPARATUS FOR ENHANCING AND ADDING CONTEXT TO A VIDEO CALL IMAGE

(75) Inventors: David J. Wheatley, North Barrington, IL (US); Santosh S. Basapur, Hanover Park, IL (US); Allyson J. Beuhler, Woodridge, IL (US); Kevin M. Brooks, Malden, MA (US)

(73) Assignee: Motorola Mobility LLC, Libertyville, IL (US)

( * ) Notice: Subject to any disclaimer, the term of this patent is extended or adjusted under 35 U.S.C. 154(b) by 1230 days.

(21) Appl. No.: 12/057,044

(22) Filed: Mar. 27, 2008

(65) Prior Publication Data
US 2009/0244256 A1    Oct. 1, 2009

(51) Int. Cl.
*H04N 7/14* (2006.01)
(52) U.S. Cl. .................. 348/14.08; 348/14.09; 348/14.1
(58) Field of Classification Search .... 348/14.01–14.03, 348/14.05, 14.07–14.09, 14.1, 14.12, 25
See application file for complete search history.

(56) References Cited

U.S. PATENT DOCUMENTS

| | | | |
|---|---|---|---|
| 6,456,732 B1 | 9/2002 | Kimbell et al. | |
| 6,970,181 B1 | 11/2005 | Fadel | |
| 8,063,929 B2 * | 11/2011 | Kurtz et al. | 348/14.08 |
| 2001/0055414 A1 | 12/2001 | Thieme | |
| 2002/0030634 A1 | 3/2002 | Noda et al. | |
| 2003/0044086 A1 | 3/2003 | Jia et al. | |
| 2006/0072847 A1 | 4/2006 | Chor et al. | |
| 2006/0158510 A1 | 7/2006 | Lia et al. | |
| 2006/0176397 A1 | 8/2006 | Panabaker | |
| 2006/0181553 A1 | 8/2006 | Choe et al. | |

FOREIGN PATENT DOCUMENTS

WO    W09957900 A1    11/1999

OTHER PUBLICATIONS

Raskar R., Ilie A. and Yu J., Image fusion for context enhancement and video surrealism, Proceedings of the third international symposium on non-photorealistic animation and rendering (NPAR2004), Annecy, France, Jun. 7-9, 2004.

* cited by examiner

*Primary Examiner* — Suhan Ni (57) ABSTRACT

A method and apparatus for enhancing a video image sent from a first terminal of a video-telephony system to a second terminal of the video-telephony system during a video telephony call. An image style is selected at the first terminal and a description of the image style is transmitted from the first terminal to the second terminal. A sequence of video images transmitted from the first terminal to the second terminal is modified by a style generator at the second terminal in accordance with description of the image style before being displayed at the second terminal. The first terminal includes a user interface that controls a style selector to produce the style description that defines the properties or the style such as a cropping region, a border style, an image filter, a background and an animation.

8 Claims, 8 Drawing Sheets

*FIG. 1*

| NAME/EVENT | STYLE NUMBER |
|---|---|
| TOM | 20 |
| DICK | 12 |
| HARRY | 20 |
| FAMILY | 07 |
| WORK | 01 |
| FRIEND | 02 |
| SPOUSE | 15 |
| XMAS | 09 |
| B'DAY | 09 |

202
204 — 206

| STYLE NO. | FRAME NO. | BORDER | EFFECT |
|---|---|---|---|
| 01 | 05 | 09 | 00 |
| 02 | 06 | 11 | 00 |
| 03 | 06 | 04 | 01 |
| 04 | 01 | 01 | 04 |
| 05 | 03 | 13 | 00 |
| 06 | 04 | 10 | 01 |
| 07 | 02 | 02 | 02 |

208
210 — 212 — 214 — 216

| FRAME NO. | SHAPE | COLOR | SIZE |
|---|---|---|---|
| 01 | 05 | 12,35,39 | 127 |
| 02 | 01 | 0,0,0 | 100 |
| 03 | 01 | 100,100,120 | 127 |
| 04 | 02 | 127,127,0 | 64 |
| 05 | 03 | 0,127,0 | 64 |

METHOD AND APPARATUS FOR ENHANCING AND ADDING CONTEXT TO A VIDEO CALL IMAGE

BACKGROUND

In video-telephony, video and voice signal are passed between two terminals or endpoints connected by a broadband or other network. The network may be an IP (Internet Protocol) network or other broadband network capable of carrying voice and data. The terminals may be dedicated video-telephony devices, such as cellular telephones, or more general purpose devices such as personal computers (PCs), Televisions (with or without set top boxes) or personal digital assistants (PDAs). Each terminal provides a screen for video display, a camera for video input, a loudspeaker for audio reproduction, a microphone for audio input, one or more processors for signal processing and a transceiver for communication.

Modification of still images and video images is known and software applications exist to allow images to be altered. For example, television pictures may be resized or cropped to fit screens with different aspect ratios.

The modification of part of a video image is known, for example, when sporting events are broadcast, regions of the image showing billboards may be modified to vary the advertisement. As another example, a background to a person may be changed by identifying the region of the image occupied by the person.

In video-telephony, a user may make various modifications to the way an incoming video image is displayed. These changes include, for example, changing the background environment, adding props, using avatars or changing the audio characteristics.

The addition of fixed frames around still images is known, as is the display of a video image overlaying a still background. Current computer based video-telephony applications present the video image either full screen or with a simple, plain border or frame.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to enhancing and adding context to a video call image. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions relating to enhancing and adding context to a video call image described herein. The non-processor circuits may include, but are not limited to, a radio receiver, a radio transmitter, signal drivers, clock circuits, power source circuits, and user input devices. As such, these functions may be interpreted as a method to perform video call enhancement. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In accordance with one aspect of the present invention, a user experience of a video-telephony system is enhanced by enabling a number of presentation "styles". The styles use a combination of visual image modification, framing style and frame shape.

The system can be implemented on a network, such as a broadband, cellular, landline telephony, or Internet Protocol Television (IPTV) network, where application software is installed. For example, it could be implemented within a computer based video-telephony application or a television-based video-telephony application or a 3G mobile handset. It could also be implemented on a combination of any of these applications. For example, the call could originate on a video telephony endpoint on a television set top box and be received by a 3G mobile handset (or vice versa).

Generally, a video-telephony terminal includes a screen for video display, a camera for video input, a loudspeaker for audio reproduction, a microphone for audio input, one or more processors for signal processing and a transceiver for communication with other terminals. Recently, it has been proposed to use a television to provide audio and video output and a user interface, a set top box (STB) to provide transceiver functions, and an additional box to provide audio and video input and signal processing. Other video telephony systems include cellular telephone based systems, landline telephony based systems and computer-based systems.

Figure 1:
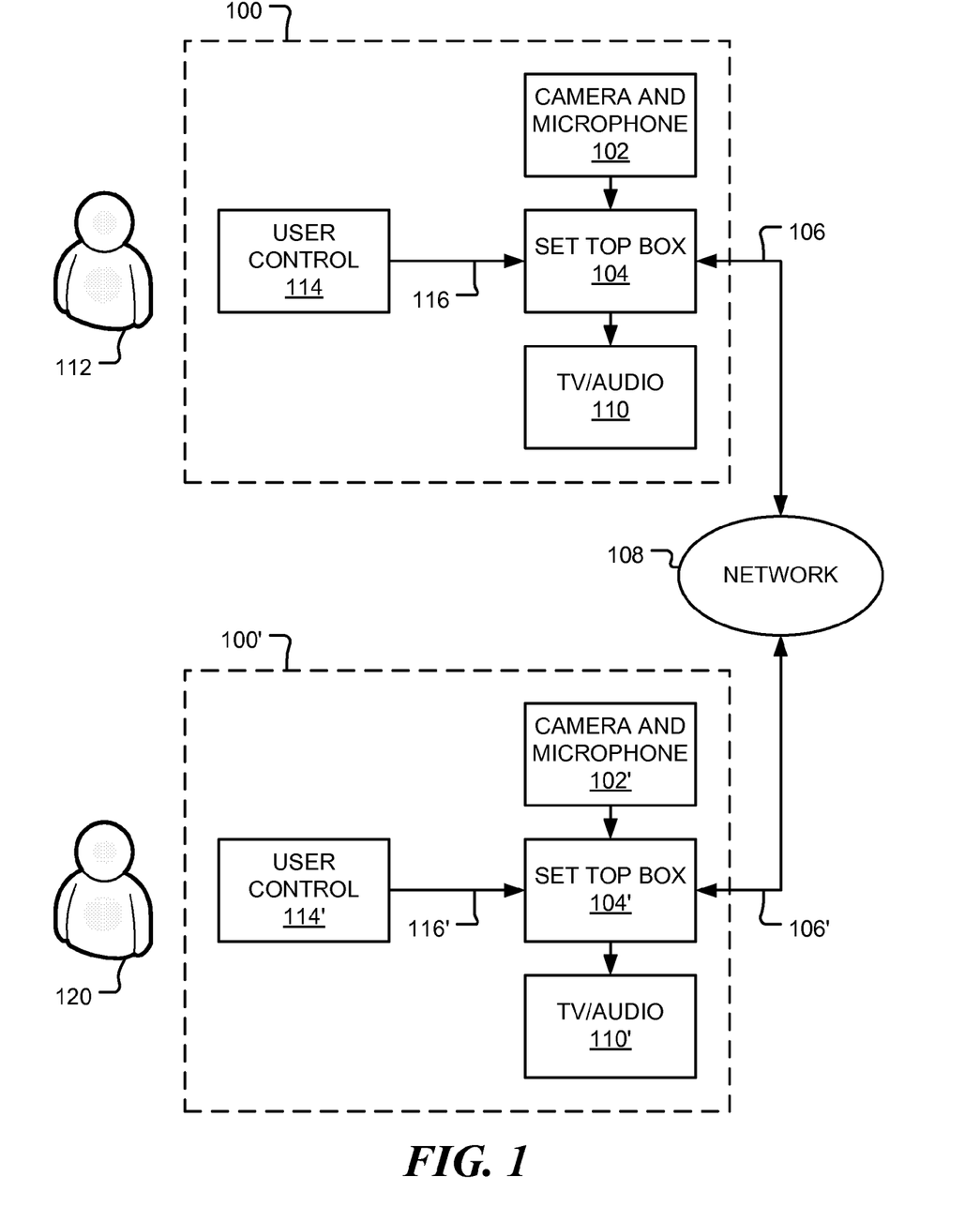
FIG. 1 is a simplified block diagram of a video telephony system in accordance with some embodiments of the invention.

FIG. 1 is a simplified block diagram of an exemplary video telephony system. Referring to FIG. 1, the video-telephony system includes a first terminal 100 that houses a video capture unit 102 that includes a microphone and a camera and provides audio and video inputs, a set top box (STB) 104 that provides a link 106 to a broadband network 108. The link between the video capture unit 102 and the set top box 104 may be an Ethernet link, for example, or other broadband link. The network 108 allows the terminal 100 to connect with one or more other terminals 100'. The connection may use, for example, a Session Initiation Protocol (SIP) to establish, modify and terminate calls and Real-time Transport Protocol (RTP) to provide end-to-end network transport functions suitable for transmitting real-time audio and video data. A Real-time Control Protocol (RTCP) may also be used to allow monitoring of the data delivery and to provide control and identification functionality. The set top box 104 also provides video and audio signals for a television 110. The television 110 may include internal and/or external audio components. In the embodiment shown in FIG. 1, the video-telephony terminal, 100, is controlled by a user, 112, using a user control 114. The user control may be a remote control that interfaces via an infra-red link or other link, 116. The user control 114 may provide controls for the video telephony functions, such as call initiation, call modification, call termination and call answering. In addition, the user control 114 may provide standard television and set-top-box control functions. Various types of user controls may be provided. Examples include a computer mouse or keyboard, a touch-screen, a TV remote control and a voice interface. A second video-telephony terminal 100' may have a similar structure, as shown in FIG. 1, or may have a different design that is compatible with the first system 100. A video telephony session may be initiated by the first user 112 using system 100 or by a second user 120 using terminal 100'.

In the exemplary system of FIG. 1, audio and video encoding is performed by the video capture unit 102 that includes a camera, a microphone and a signal processor, while audio and video decoding is performed at the second endpoint. In one embodiment of the invention the decoding could be performed in the set top box 104. In a second embodiment of the invention the decoding is performed on the camera at the second endpoint. In a further embodiment, the encoding is performed on a mobile handset. The video capture unit 102 may also perform other functions such as camera steering, camera zoom control, image preprocessing, image analysis, audio echo cancellation and noise reduction.

Web-cam products and computer imaging for video-telephony, generally present a simple on-screen video image of the caller, displaying the image within a rectangular box with a black line or blue line around the box. A menu bar may also be presented. However, it may be desirable to present different image styles to different video call participants. For example, the call style could be dependent upon the time of day or time of year and it can be associated with one person on the contact list many people on the contact list, or specific categories of contacts. For example, a call to a significant other might always use romantic style, or a particular style could be associated with the entire contact list, reflecting the sender's personal style to the outside world. At the holidays, a Christmas style could be used for sending to multiple endpoints. Different styles may also be associated with categories of people, for example; family, friends or work colleagues.

In accordance with certain aspects of the present invention, three elements of the video image are modified, in combination or separately, to provide such personalization or expression of style.

Firstly, the shape of the displayed image can be varied. Examples of image shapes include square, rectangular, oval and circular shapes.

Secondly, the framing or border style or the color of the frame or border can be varied. Examples of frame types include traditional picture frames, window frames, portholes, simple lines, symbols and objects which may be static or animated. The framing or video image background may also be dynamically populated with, or modified, on the basis of information or data derived from sources external to the current system, such as internet sources.

Thirdly, the image itself can be modified in a way which complements the framing style. For example, sepia tones or a soft focus could be used.

Various combinations of frame shape, style and image treatment can be used to create a wide variety of different contexts, styles or impressions. Examples include:

"Romantic", in which the video image has a 'soft' focus appearance, and possibly, non-rectangular framing consists of hearts or some other romantic metaphor.

"Olde Worlde", in which the video image has a sepia-toned appearance and in which the border is a traditional, rectangular picture frame, possibly ornamental in appearance.

"Professional", in which the video image is relatively sharp, with little modeling and the framing may be black/silver and "executive" in appearance.

"Old Movie", in which the image framing consists of theater curtains, swags and pelmet and the black and white video image is processed to create a scratched, 16 mm film appearance.

A large number of other examples and styles could be created and embodied. For example objects or symbols (animated or static) may be displayed within the area of the frame, such as flashing disco lights, beating hearts, flowers and so on.

In some embodiments, the presentation may involve only the addition of a frame, with no modification of the video stream, examples include the effect of viewing the video (and the caller) as if through a ship's porthole, through a hole in a brick wall, through a hole in broken glass or within the shape of a TV screen or a representation of a TV enclosure, giving the appearance of being a TV presenter. Many other styles will be apparent to those of ordinary skill in the art.

In some embodiments, the image framing may also be used for the purposes of advertising or promotion. Examples of this include use of an automobile license plate surround as an image frame. The surround may show the logo of the callers favorite sports team, their University Alumnus affiliation, hobbies or interests. Another example would be a billboard, in which advertising forms part of the surround or part of the image. In such cases, the advertising revenue may be used to subsidize the video call service.

In some embodiments, the frame may additionally be used to depict or present contextual information, which may be related to the caller or some aspect of the caller's environment or situation, for example by linking to various internet information sources, it may display the weather conditions that the caller is currently experiencing, whether it is night/day, or other contextual information which would otherwise not be available to the receiver(s) of the video call.

Figure 2:
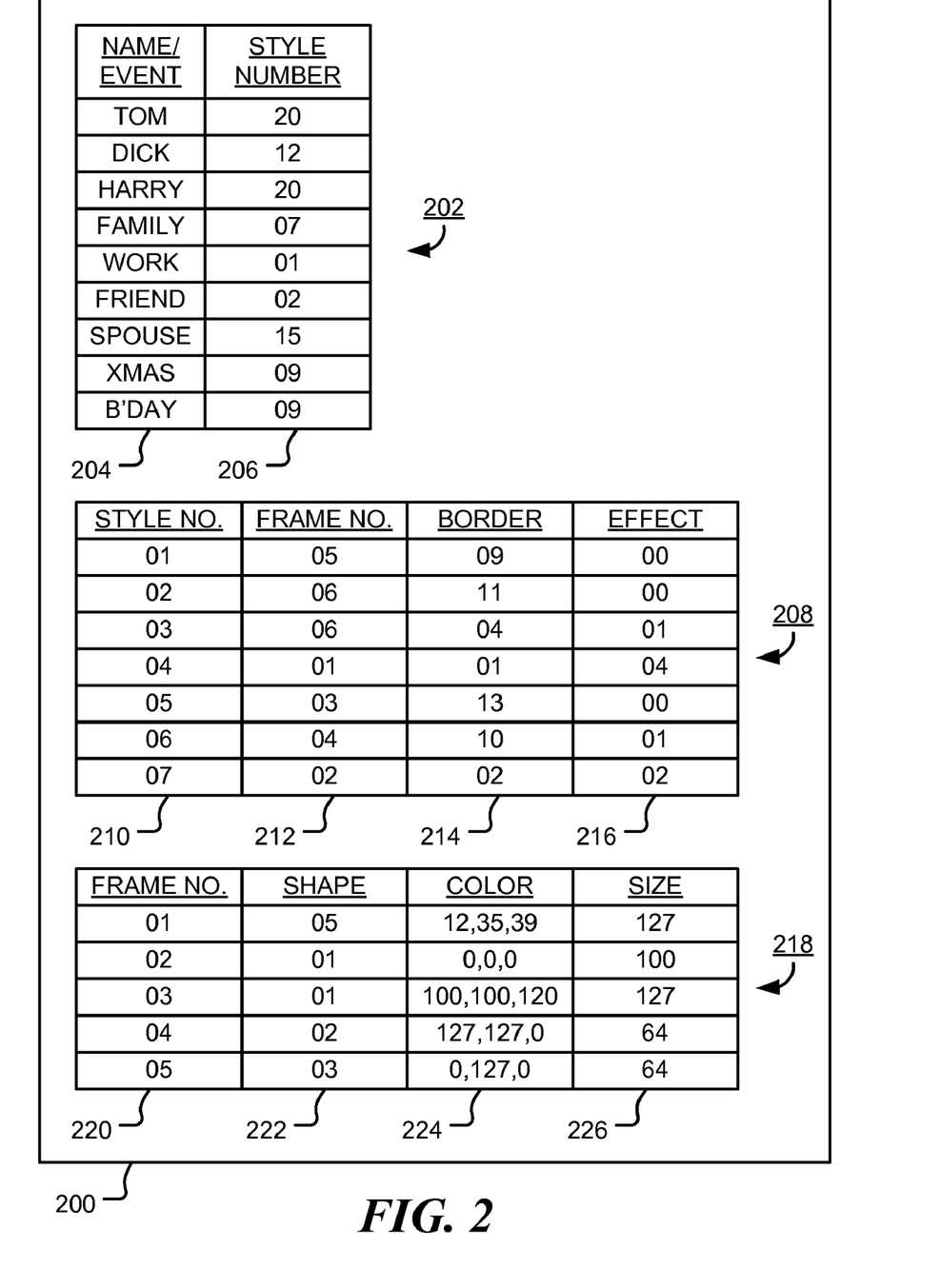
FIG. 2 is a diagrammatic representation of a computer readable memory of a video telephony system in accordance with some embodiments of the invention.

FIG. 2 is a diagrammatic representation of a computer readable memory of a video telephony system in accordance with some embodiments of the invention. The memory 200 contains list 202 that associates names or events 204 with particular image styles 206. In example, styles are associated with individuals (Tom, Dick and Harry), groups of individuals (family members, work associates, friends or a spouse) and events (Christmas, birthday, etc.). Each style is identified by an identifier or style code 206. Also contained in the memory is a style database 208 that defines the style codes 210 in terms of constituent components or style elements 212, 214 and 216. In this example, each style is defined by a frame 212, a border 214 and an effect 216. Other style elements, such as backgrounds, captions and animations could also be included in each style definition. The components themselves may also be defined in terms of their constituents. For example, each frame style is defined in a frame database 218. Each frame style has a shape 222, a color 224 and a size 226. The shape codes 222 may represent, for example, rectangles, ovals, hearts, stars, clouds, diamonds, circles etc., and each may be defined by a link to functions that generate the shape. Each color 224 may be defined, for example, by the 8-bit red, green and blue components of the color. The sizes 226 may be referenced to some standard size with, for example, the 127 representing full scale. Borders and effects may be similarly defined and may include alternative patterns or textures. Thus, a hierarchy of style elements is defined.

A user may define new styles by defining new combinations of frames, borders and effects using pre-existing components and, further, by defining or creating new frames, borders and/or effects which are then combined to form new styles. In addition, a user may define new styles using a PC and upload them to a central network server for access by the STB. In some embodiments, framing styles may be created from the user's own visual components, such as photographs, video clips, children's drawings or other personal media. These may be created on the users PC and stored on a network server to be downloaded to the users set top box.

Figure 3:
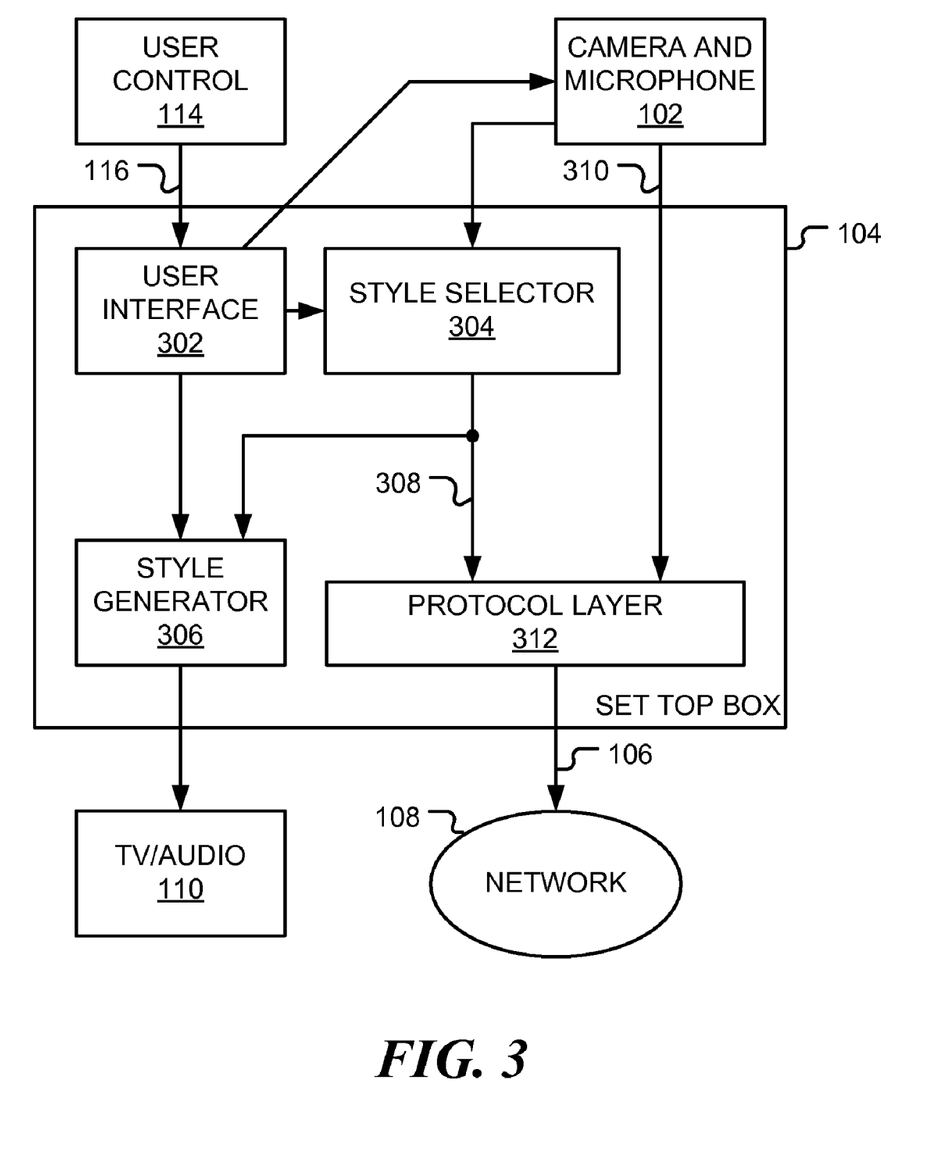
FIG. 3 is a block diagram of a video-telephony system in a transmission mode, consistent with some embodiments of the current invention.

FIG. 3 is a block diagram of an exemplary video-telephony system consistent with some embodiments of the current invention. FIG. 3 shows some of the functional modules of the set-top-box used in transmission of a video call. The present invention is not limited to set-top-boxes. In other embodiments, which utilize alternative architectures, some of all of these functions may be performed by other components in video telephony system. Referring to FIG. 3, a user utilizes a user control 114 to interact with a user interface 302. Information is fed back to the user via the television and audio unit 110 using on-screen menus and/or audio prompts. The user interface may also be voice activated. Dependent upon user input, the user interface interacts with a style selector 304 to select which style is to be used when the video signal is displayed to the recipient of a call. A style generator 306 may be used to display an example of the selected style to the user to aid in the selection process. The style selector 306 outputs a code 308 associated with the selected style. The style code 308, together with the encoded audio video signal 310, is a passed to a network protocol layer 312, which formats the encoded audio video signal 310 and the style code 308 as a signal 106 for transmission over network 108.

In this embodiment, the video signal 310 is not modified and only the code 308 is sent (as part of a control signal) to the recipient, rather than an image of a frame. In an alternative embodiment, the individual frames of the video signal are modified to add the frame before the video sequence is encoded. In this approach, it may be advantageous for the style generator and the video encoder to be implemented in the video capture unit 102.

In one embodiment of the invention, the personalized video call is stored as a file on the set top box hard drive of the sender, on a computer hard drive for example, and then sent at a later date as video mail to another endpoint or multiple endpoints.

Styles and style elements may be stored locally on the set top box, on a linked home gateway unit, on a remote network server, or at locations in the video telephony system or network. These can be modified or defined by the user and uploaded and/or downloaded as appropriate.

The video image, displayed in the selected style, may be part of a user interface rendered by a browser, or software functioning like a browser, at each endpoint or terminal. The browser of each endpoint accepts the video and audio streams, as well as the control and contextual information from the paired endpoint, and renders them according to the receiving user's stated preferences. Endpoint browsers would be implemented on which every type of endpoint platform is being used, be it a set-top box, TV, mobile phone, VOIP phone, etc. Each browser renders the incoming data according to the specific functional capability of the platform and according to the user's set preferences. These preferences may include various stylistic options discussed elsewhere in this specification having to do with frame shape and picture shape.

Separate from the browser, control data is sent between the endpoints to influence, but not necessarily dictate, the way the user interface is rendered by the browser. For instance, each user can use the user interface on their endpoint to specify personal contextual information to be transmitted to their paired endpoint and the influence the framing of their own image. Examples of such contextual information are:

General geographical location information used for displaying local weather conditions.

The user's employer, business or business affiliation used for displaying logo and stock market or other business related information.

Link information to the user's Internet-based social networking service, where personal news, thumbnail pictures or other elements from their personal pages can be incorporated into a dynamic or interactive contextual frame.

This control data can be transmitted independently from the video and audio using RSS, for example. In this implementation, each endpoint makes an HTTP connection to the paired endpoint and access an RSS feed that holds the contextual information, such as that mentioned above.

Figure 4:
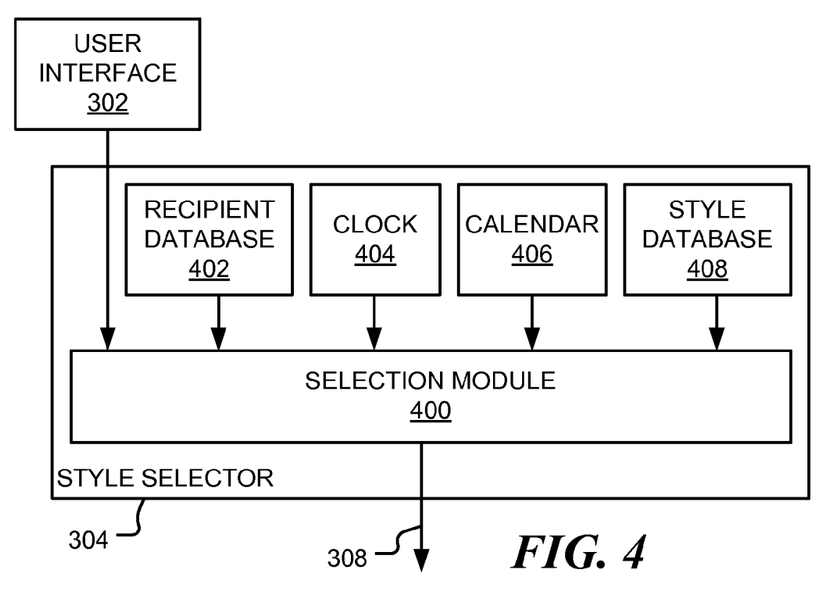
FIG. 4 is a block diagram of an exemplary style selector, in accordance with some embodiments of the invention.

FIG. 4 is a block diagram of an exemplary style selector 304, in accordance with some embodiments of the invention. The selector module 400 is controlled by user interface 302 and is used to select a style when a call is initiated. The selector module 400 may use recipient information stored in database 402. The recipient information may be used to select a style dependent upon the recipient's identity or category. For example, if recipient is a family member then one style will be selected; if the recipient is a professional associate a different style will be selected, and so on. This can also be applied to other categories such as sports friends, regular work friends and colleagues, social calls, etc. This approach is advantageous for group calls, where specifically selecting a style for each participant prior to initiating a call could be an onerous task—particularly for a group call where the user may wish the presentation style to be the same for all recipients.

The style may also be selected dependent upon other factors, such as the time of day as provided by clock 404 or the date or season as provided by calendar 406. In all cases, the association between the selection factor and the style used is determined by the user. The styles themselves may be selected from a style database 408 that contains previously defined styles. Alternatively, the styles may be generated by the user. This may be done, for example, by combining style elements. User defined styles may be stored in the style database 408 for later use.

The style may also be selected and/or populated with dynamic information derived from internet sources or the frame content selected based on such dynamic information. Examples of this include displaying snowflakes in the frame when internet sources indicate that snow is falling in the caller's location, or displaying stars when it is nighttime.

The output from the style selector 304 is a code 308 associated with the style. This style code may identify a predefined (standard) style or may describe the style elements (the individual components of the style) to be used to generate a style. Style elements may include, for example, the shape, thickness, color and pattern of a border, and the type of image processing to be used. The use of a style code 308 avoids having to modify every frame of the video sequence to add the frame. It also allows the recipient to change the style, if they so desire.

Figure 5:
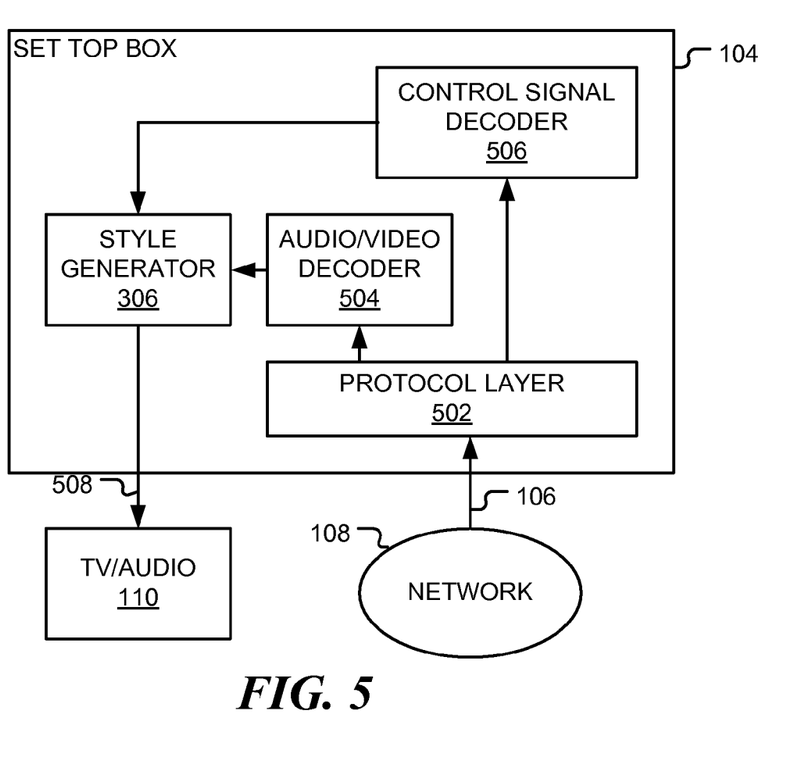
FIG. 5 is a block diagram of a video-telephony system in a reception mode, consistent with some embodiments of the current invention.

FIG. 5 is a block diagram of an exemplary video-telephony system consistent with some embodiments of the current invention. FIG. 5 shows some of the functional modules of the set-top-box used in reception of a call. Some of all of these functions may be performed by other components in video telephony systems having a different architecture. Referring to FIG. 5, an incoming data stream 106 from network 108 is received and processed by protocol layer 502. The real-time audio and video components are passed to an audio and video decoder 504 where the voice and video frames are recovered. Control codes recovered from the data stream are passed to a control signal decoder 506. In one embodiment of the invention, some of the control codes are style codes that relate to the style that is to be applied to the video when it is displayed to the recipient. The style codes are passed to style generator 306, which modifies the video signal from the audio/video decoder 504 in accordance with the style codes. The modified video signal and audio signal 508 is sent to the television 110 for presentation to the recipient.

In an alternative embodiment, the video signal is modified in the sender's system. In this embodiment, the decoded audio and video signals from audio/video decoder 504 may be passed directly to the television 110 for presentation to the recipient.

The style may be selected so as to enhance the perceived quality of the image. For example, if sampling of the received image indicated that it was rather dark, a lighter framing is selected. The perception of the image, relative to the frame, would be somewhat lighter than it really was. In the case of a slightly overexposed image, a darker frame is selected.

While the placement of the subject in the video frame is important, the importance is less when a rectangular frame is used. However, the subject's placement in the video frame is very important when the shape of the frame crops the video image to a non-rectangular shape, like an oval.

Figure 6:
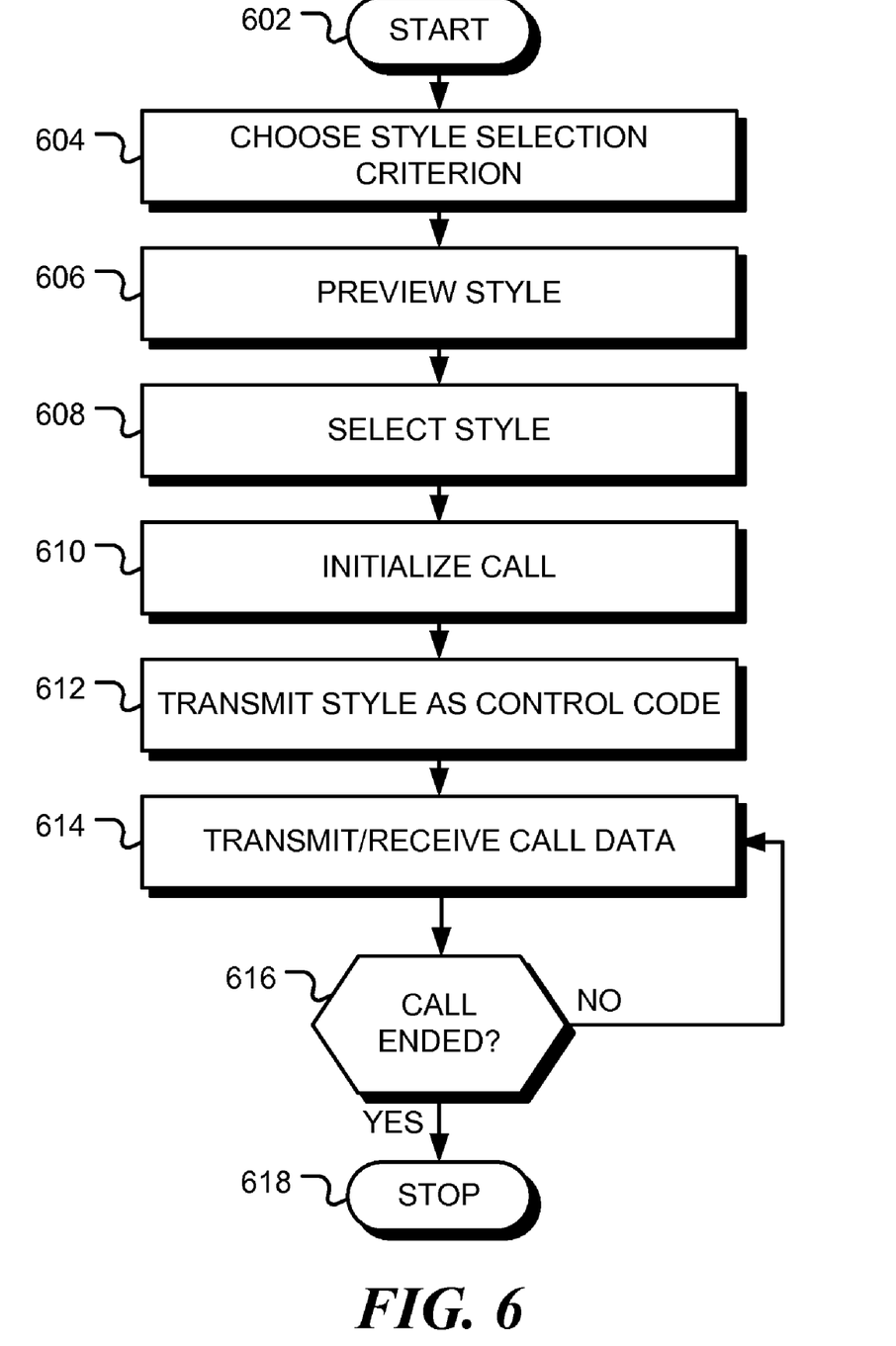
FIG. 6 is a flow chart of a method for transmitting enhanced video telephony images in accordance with certain embodiments of the invention.

FIG. 6 is a flow chart of a method for enhancing video telephony images in accordance with certain embodiments of the invention. Following start block 602 in FIG. 6, a criterion for style selection is chosen at block 604. A user may, for example, choose manual selection, in which the style for the current call is selected from a database of styles or designed by the user using style elements. Alternatively, the user may choose an automatic style selection. For example, the style may be chosen dependent upon the identity of the recipient or upon the relationship between the caller and the recipient (e.g. friend, family member, co-worker, professional associate, etc) or it may be chosen according to the season, the date, the occasion, the time of day or some other criterion. Still further, some elements of the style may be chosen according to the properties of the image. For example, a dark border could be added to a light image, or border color could be chosen dependent upon the color content of the image. At block 606 the user may optionally preview the style on his, or her, own video display. At block 608 the style is selected and a corresponding style code is generated. The call is initiated at block 610 using, for example, a Session Initiation Protocol (SIP), and at block 612 the style code is transmitted to the call recipient. The style code may be transmitted using a Real-time Control Protocol (RTCP). Optionally, the style may be transmitted at intervals throughout the duration of the call. In this manner the style may be changed during the call. This may be required, for example, if any element of the style is dependent upon a property of the video image that may change during the duration of the call (such as the lighting or the position of the user). At block 614 the call is started and real-time video and audio is transmitted to and received from the call recipient via a broadband network. If the call ends, as depicted by the positive branch from decision block 616, the process ends at block 618. Otherwise, as depicted by the negative branch from decision block 616, flow returns to block 614 and exchange of real-time audio and video information continues. Call termination may be controlled using SIP.

Figure 7:
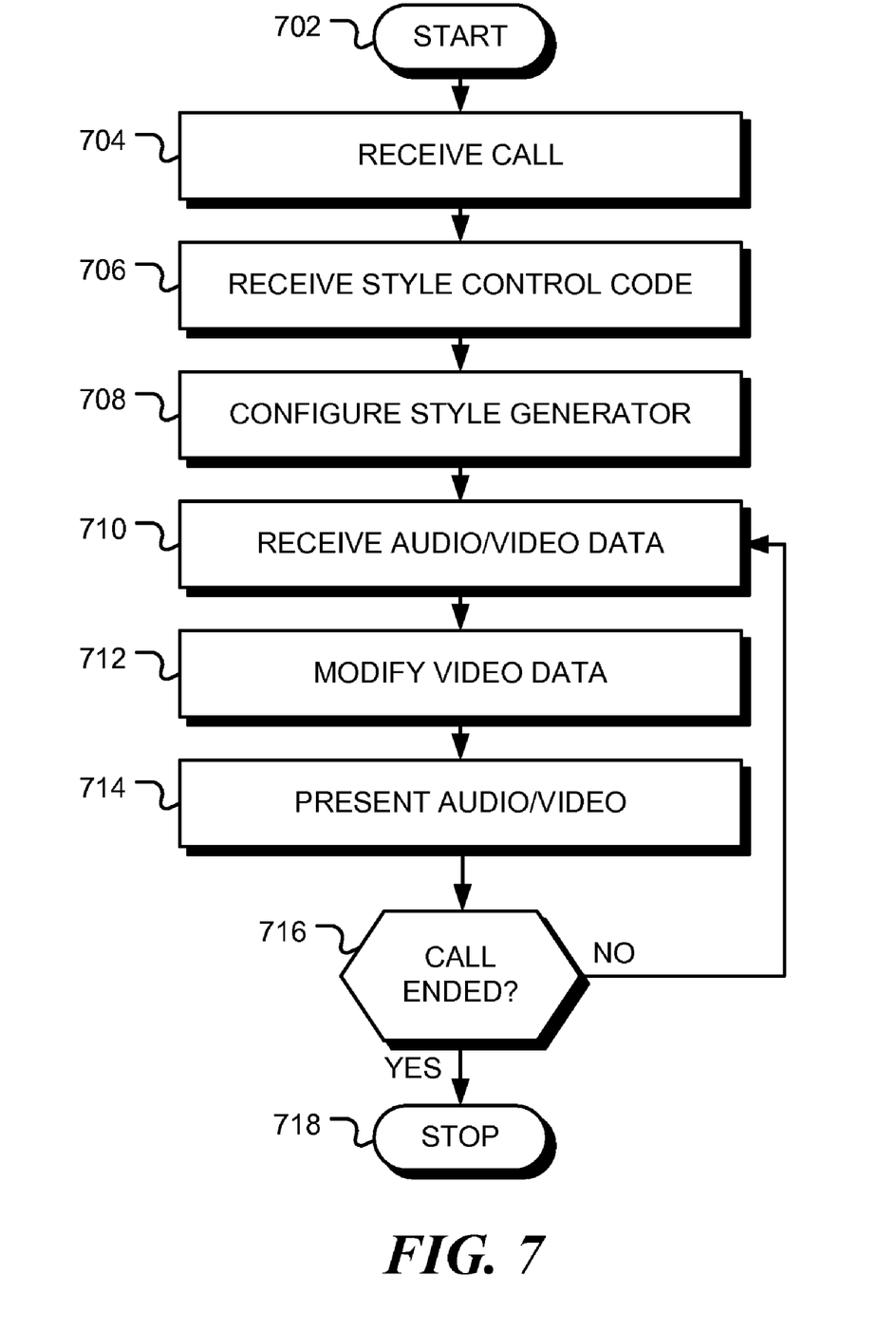
FIG. 7 is a flow chart of a method for receiving enhanced video telephony images in accordance with certain embodiments of the invention.

FIG. 7 is a corresponding flow chart for the recipient's video-telephony system. Following start block 702 in FIG. 7, the incoming call is received at block 704. At block 706 the style code is received and is used to configure a style generator at block 708. Once the call has started, incoming audio and video is received at block 710. At block 712 the video images are passed to the style generator and are modified, as specified by the received style code. The resulting modified video and the audio are presented to the recipient at block 714. If the call ends, as depicted by the positive branch from decision block 716, the process ends at block 718. Otherwise, as depicted by the negative branch from decision block 716, flow returns to block 710 and receipt of real-time audio and video information continues. During the call, the recipient's video-telephony system continues to send audio and video data to the call initiator.

Figure 8:
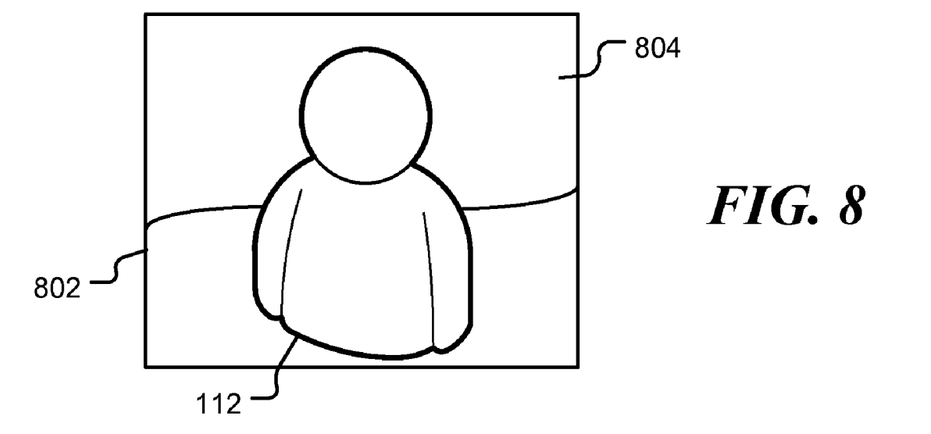
FIGS. 8-10 show a method of video image enhancement in accordance with certain embodiments of the invention.
Figure 9:
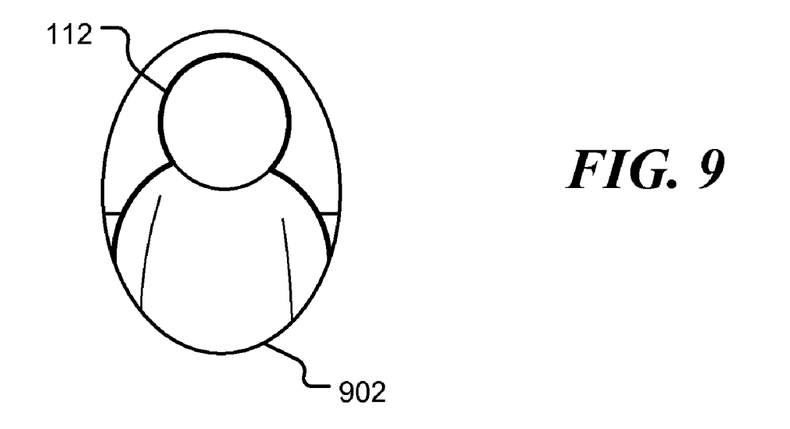
Figure 10:
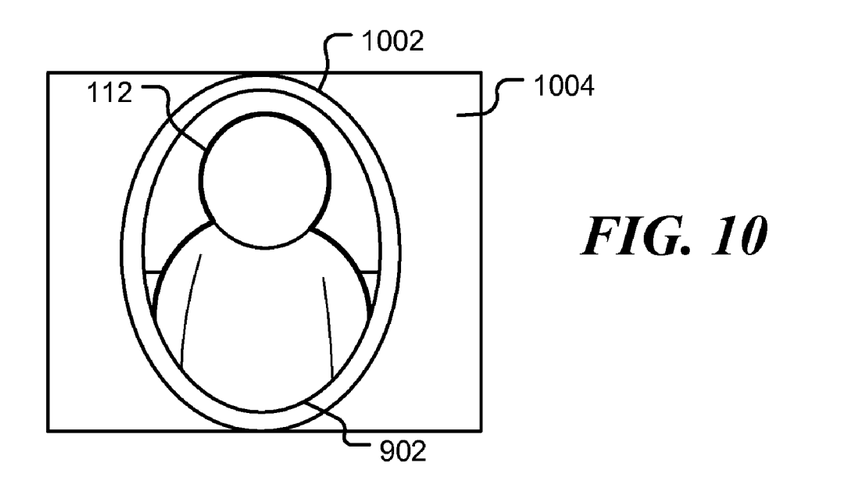

FIGS. 8-10 show how a video image is enhanced in accordance with certain embodiments of the invention. FIG. 8 depicts a video image 802 received from a caller. The image shows the caller 112 and an original background 804. FIG. 9 shows the same image modified by cropping to produce an oval shaped image 902. The shape of the cropping is specified by a received style code. The size and position may also be specified. FIG. 10 shows the same image further modified by adding a frame 1002 and a background 1004. The properties of the frame 1002 (thickness, color, and/or pattern etc.) may be specified by the style code. The background 1004 may be also be specified by the style code. In an additional step (not shown) the retained image may be modified by, for example, altering the color, filtering or applying effects. This step may be performed before or after cropping.

Figure 11:
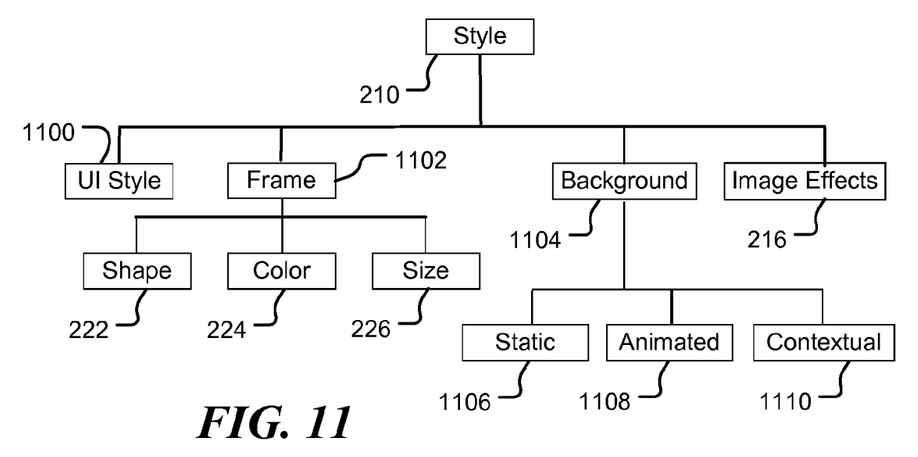
FIG. 11 is a diagrammatic representation of an exemplary style and its constituent elements.

FIG. 11 is a diagrammatic representation of an exemplary style and its constituent elements. Referring to FIG. 11, the style 210 has user interface (UI) style elements 1100, such as menu style, font, colors etc., frame elements 1102, such as shape 222, color 224, size 226, etc., background elements 1104, such as static elements 1106, animated elements 1108 and contextual elements 1110, and image effects 216. The style 210 may be "traditional", "porthole", "wooden" or "license plate" for example. The frame shape 222 may be "square", "oval", "round", for example. The image effects 216 may be "sepia" or "soft-tone", for example. Static background elements 1104 may be still images, wallpaper or curtains, for example. Contextual information 1110 may be local weather, user data, time, etc. It will be apparent to those of ordinary skill in the art that other style elements may be used.

Figure 12:
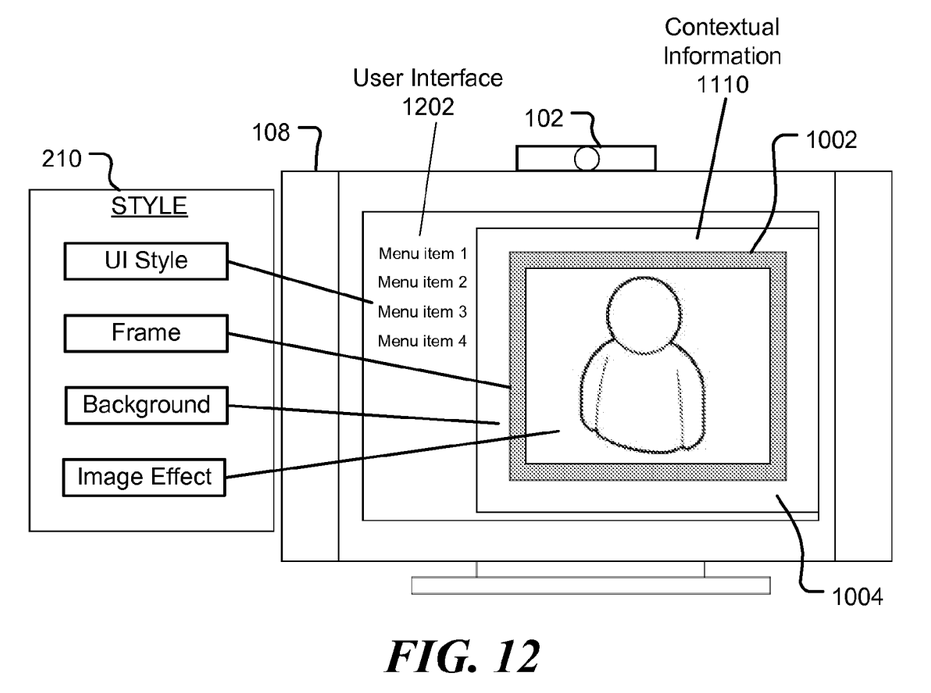
FIG. 12 illustrates how some of the style elements are used in the presentation of a video image.

FIG. 12 illustrates how some of the style elements are used in the presentation of a video image. In FIG. 12, a video image is displayed on television 108. The television screen shows the images surrounded by a frame 1002 and backed by background 1004. The television screen also shows a user interface 1202 and contextual information 1110. Any, or all, of the elements displayed on the television may be specified by the selected style 210. As described above with reference to FIG. 11, the style defines the user interface, the frame, the background and the image effect. In this way, the sender of the video is able to influence the look of the screen for the recipient. However, the recipient may have the ability to override or change any of the elements.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A video-telephony system comprising:
   a video capture unit having a first video signal as output;
   a user interface;
   a style selector responsive to the user interface and having a first style description as output;
   a network transmitter that transmits the first style description and the first video signal over a network to a recipient terminal;
   a network receiver that receives a second style description and a second video signal from the network;
   a style generator that modifies presentation of the second video signal in accordance with the second style description to produce a modified video signal; and
   a video display;
   wherein the first and second style descriptions define at least one style property selected from the group of style properties consisting of: a cropping region, a border style, an image filter, a background, and an animation.

2. A video-telephony system in accordance with claim 1 wherein the user interface comprises a graphical display and a remote control.

3. A video-telephony system in accordance with claim 1 wherein the video display comprises a television and wherein the network transmitter and the network receiver are elements of a set top box.

4. A video-telephony system in accordance with claim 3 wherein the style generator is an element of the set top box.

5. A video-telephony system in accordance with claim 3 wherein the video capture unit comprises a camera and a microphone unit operable to communicate with the set top box.

6. A video-telephony system in accordance with claim 3 wherein the style selector comprises a selection module that associates entries in a recipient database with entries in a style database.

7. A video-telephony system in accordance with claim 3 wherein the style selector comprises a selection module that associates recipient groups with entries in a style database.

8. A video-telephony system in accordance with claim 1 further comprising an image analyzer, wherein the style selector is responsive to the image analyzer.

* * * * *